US 6,735,346 B2

(12) United States Patent
Woodford et al.

(10) Patent No.: US 6,735,346 B2
(45) Date of Patent: May 11, 2004

(54) HD FOURIER TRANSFORMS FOR IRREGULARLY SAMPLED DATA

(75) Inventors: Paul W. Woodford, Laurel, MD (US); Fred F. Froehlich, Baltimore, MD (US)

(73) Assignee: Essex Corporation, Columbia, MD (US)

( * ) Notice: Subject to any disclaimer, the term of this patent is extended or adjusted under 35 U.S.C. 154(b) by 105 days.

(21) Appl. No.: 10/012,049

(22) Filed: Dec. 11, 2001

(65) Prior Publication Data

US 2002/0122604 A1 Sep. 5, 2002

Related U.S. Application Data

(60) Provisional application No. 60/254,612, filed on Dec. 11, 2000.

(51) Int. Cl.⁷ .......................... G01S 13/90; G06F 17/14; G06K 9/36
(52) U.S. Cl. .......................... 382/279; 382/280; 342/25; 342/196; 708/315; 708/403; 708/420
(58) Field of Search .......................... 342/25, 196, 179; 382/280, 279; 708/315, 403, 404, 405, 420

(56) References Cited

U.S. PATENT DOCUMENTS

| | | | | |
|---|---|---|---|---|
| 4,978,960 A | * | 12/1990 | Newcomb et al. | 342/25 |
| 5,061,931 A | * | 10/1991 | Farina et al. | 342/25 |
| 5,334,980 A | * | 8/1994 | Decker | 342/25 |
| 5,469,167 A | * | 11/1995 | Polge et al. | 342/25 |
| 5,805,098 A | * | 9/1998 | McCorkle | 342/25 |
| 5,910,785 A | * | 6/1999 | Normant | 342/25 |
| 5,969,662 A | * | 10/1999 | Hellsten | 342/25 |
| 6,072,419 A | * | 6/2000 | Normant | 342/25 |
| 6,087,981 A | * | 7/2000 | Normant et al. | 342/134 |
| 6,147,636 A | * | 11/2000 | Gershenson | 342/22 |
| 6,384,766 B1 | * | 5/2002 | Ulander | 342/25 |

OTHER PUBLICATIONS

Desai et al, Convolution backprojection image reconstruction for spotlight mode synthetic aperture radar, IEEE Transactions on Image Processing, Oct. 1992, vol 1, iss 4, p 505–517.*
J. Fortuny, An efficient 3–D near–field ISAR algorithm, IEEE Transactions on Aerospace and Electronic Systems, Oct. 1998, vol 34, iss 4, p 1261–1270.*
Lazarov et al, Stochastic model of complex ISAR signals and spatial correlation image reconstruction procedure, Proceedings of the Second International Symposium of Trans Black Sea Region on Applied Electromagnetism, Jun. 27–29, 2000, p 96.*
Bauck et al. "Tomographic Processing of Spotlight–Mode Synthetic Aperture Radar Signals with Compensation for Wavefront Curvature" IEEE, 1998, pp. 1192–1195.
Lewitt "Reconstruction Algorithms" Transform Methods Proceedings of the IEEE, 71(3), pp. 390–408, 1983.
Smith "Cone–Beam Tomography: Recent Advances and a Tutorial Review" Optical Engineering 29(5), pp. 524–534, 1990.
Mann et al. "Spotlight–Mode Synthetic Aperture Radar without Fourier Transforms" SPIE vol., 2230, pp. 2–13, 1994.

* cited by examiner

Primary Examiner—Bhavesh M. Mehta
Assistant Examiner—Christopher Sukhaphadhana
(74) Attorney, Agent, or Firm—Morrison & Foerster LLP (57) ABSTRACT

A collected data is divided into M single valued subsets, where M is greater than zero. A two-dimensional subset image is formed from each single valued subset. Then, a fast Fourier transform is performed on each image to obtain a two-dimensional subset frequency space. Next, a one-dimensional discrete Fourier transform in z, where z is an integer equal to or greater than zero, is performed. Lastly, a two-dimensional discrete Fourier transform in (x,y) for each value of z is performed, thereby forming the three-dimensional volume from the collected data set.

32 Claims, 7 Drawing Sheets

HD FOURIER TRANSFORMS FOR IRREGULARLY SAMPLED DATA

TECHNICAL FIELD OF THE INVENTION

The present invention relates to a method for efficiently computing the Fourier transform of an irregularly-sampled data set in forming multi-dimensional synthetic aperture images.

BACKGROUND OF THE INVENTION

Figure 1:
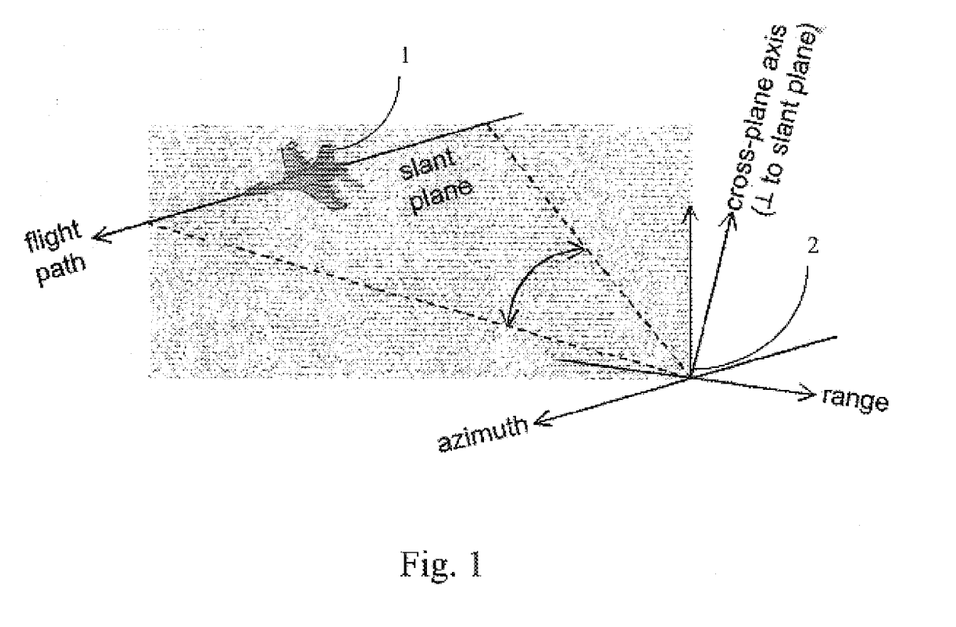
FIG. 1 illustrates an example of a single two-dimensional linear SAR collection.
Figure 2:
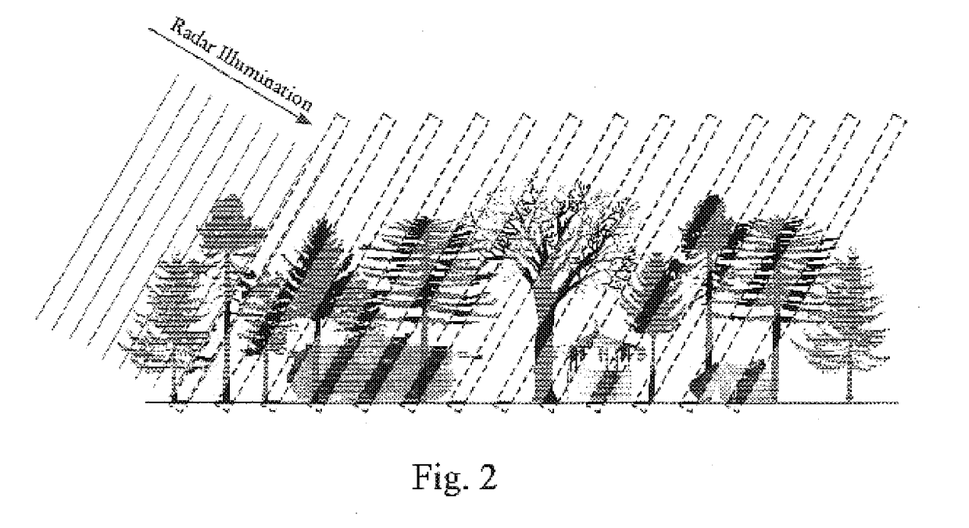
FIG. 2 illustrates an example of a two-dimensional SAR imaging of a three-dimensional scene.

Synthetic aperture radar (SAR) may be an attractive imaging technique because of its ability to operate under all lighting conditions and through clouds and haze. FIG. 1 illustrates an example of a collection of 2-D SAR data. An airplane 1 flies past an area of interest 2 while collecting radar data. The flight path is usually in a straight line. The flight direction is called the azimuth. The direction normal from the flight path to the region of interest 2 is called the range. The plane which is formed by the azimuth and range directions is the slant plane. The normal to the slant plane is the elevation. Processing algorithms form a high-resolution 2-D image of the region of interest 2 by combining the information from all of the radar data. In doing so, the processing algorithms effectively synthesize an aperture that is much larger than the actual aperture of the antenna. Hence the name, "synthetic aperture radar".

Figure 3:
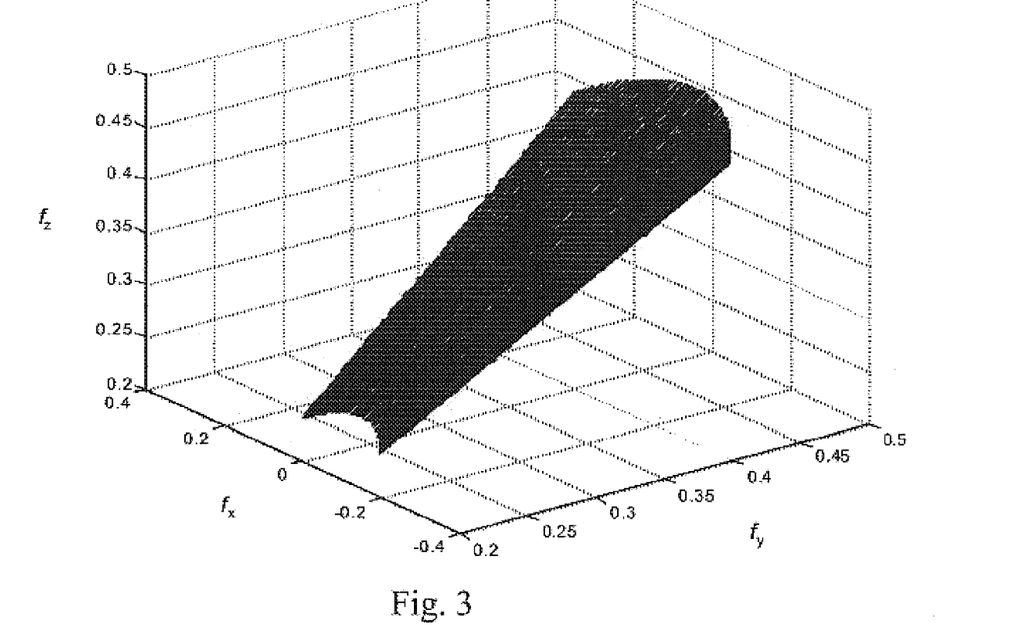
FIG. 3 illustrates an example of a three-dimensional frequency space resulting from a single linear SAR collection.
Figure 4:
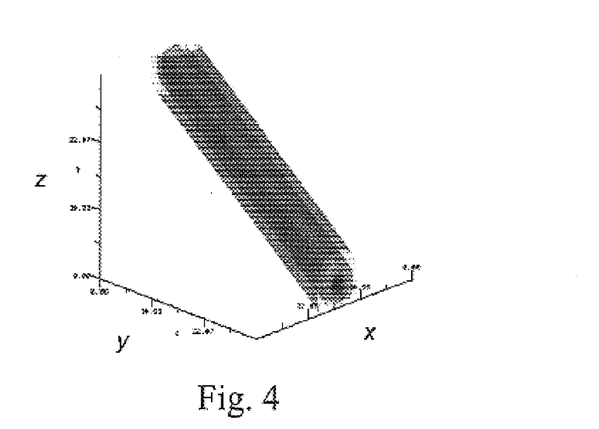
FIG. 4 illustrates an example of a three-dimensional impulse response resulting from a single linear SAR collection.

While successful in many applications, the 2-D form of SAR yields very limited information about the distribution of objects in the elevation dimension. Further, the 2-D form of SAR has limited utility in detecting and identifying objects obscured by overlying layers. FIG. 1 illustrates an example of 2-D SAR imaging of a 3-D scene that contains objects concealed by overlying foliage. The radar illuminates the scene from the left at a single elevation. The flight path is perpendicular to the plane of the page. Because a conventional SAR image is purely 2-D, the energy within a given (range, azimuth) pixel is the sum of the energy returned by all scatterers at that range and azimuth, regardless of their elevation. In three dimensions, the frequency space is a plane (as shown, for example, in FIG. 3) and the image pixels have a columnar shape (as shown, for example, in FIG. 4). Energy returned from the overlying layers (foliage, in this case) may be integrated with the energy returned from the objects below, which reduces the signal-to-clutter ratio of the objects. Resolution in the third dimension may be required to separate the desired signal from the clutter.

Figure 5:
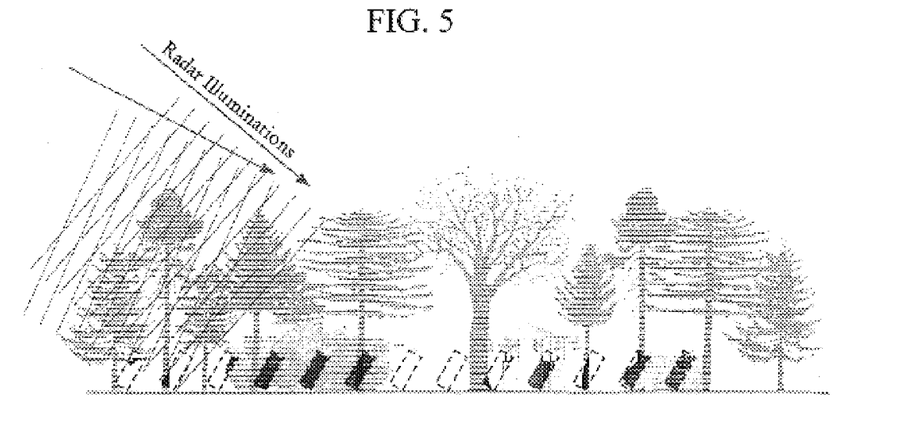
FIG. 5 illustrates an example of a three-dimensional SAR imaging of a three-dimensional scene.
Figure 6:
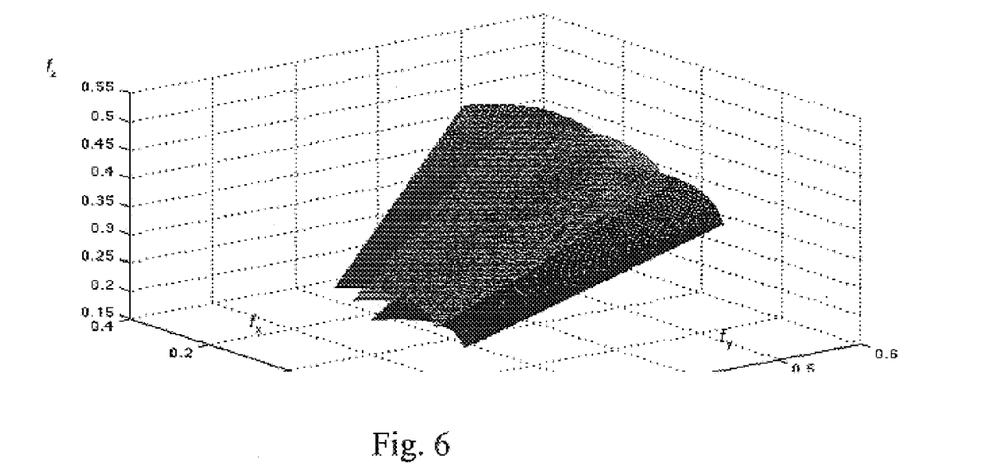
FIG. 6 illustrates an example of a three-dimensional frequency space resulting from multiple parallel linear SAR collections.
Figure 7:
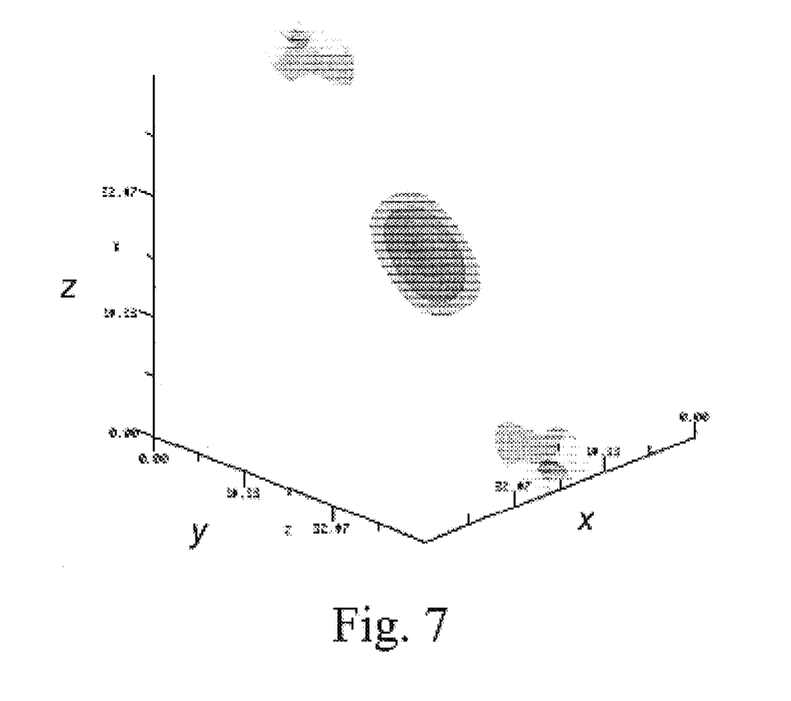
FIG. 7 illustrates an example of a three-dimensional impulse response resulting from multiple parallel linear SAR collections.

Three-dimensional SAR extends the synthetic aperture concept used in one dimension (azimuth) in conventional SAR to two dimensions (azimuth and elevation). An example of 3-D SAR imaging of a 3-D scene is illustrated, for example, in FIG. 5. The radar now illuminates the scene from the left at multiple elevations, which creates a synthetic aperture that has two dimensions instead of one. The frequency space from this type of collection contains multiple planes, as shown, for example, in FIG. 6. The resulting impulse response shows resolution in all three dimensions, as shown, for example, in FIG. 7. The returns from the overlying layers and the objects on the ground are contained in different voxels. Thus, the signal-to-clutter ratio is improved enabling easier detection and identification of the objects. The 2-D aperture also effectively increases the coherent integration time, which improves the signal-to-noise ratio. It is noted that interferometric SAR (IFSAR), which collects data at two elevations and is sometimes referred to as 3-D SAR, is in fact a degenerate case of true 3-D SAR.

Forming 3-D synthetic aperture (SAR) images may be a computationally-intensive task because of the irregular sampling of the data and the curvature of the sensing wavefronts. Algorithms that have been proposed for forming 3-D SAR images all have drawbacks with respect to their computational complexity or compensation for the irregular sampling or wavefront curvature. Time domain backprojection (TDBP) is the standard image formation technique because it perfectly compensates for non-ideal antenna motion and for wavefront curvature. However, the computational complexity can be extremely high. Various fast TDBP methods have been proposed that reduce the computational complexity with varying tradeoffs in image quality. The polar format algorithm (PFA) and the range migration algorithm (RMA) are much faster, but the PFA cannot compensate for wavefront curvature and the RMA cannot compensate for irregular antenna motion.

Accordingly, a need exists for an image formation technique which can compensate for irregular sampling and wavefront curvature, but which is also faster than the TDBP methods.

SUMMARY OF THE INVENTION

One embodiment of the invention includes a method of forming an N-dimensional volume, where N is not less than two, from a collected data set which comprises a plurality of single-valued subsets, comprising: forming at least one (N-1)-dimensional images from each of the single-valued subsets, respectively; performing a convolution operation on each (N-1)-dimensional image and an impulse response at different values of $x_N$, where $x_N$ is a dimension not formed in the (N-1) dimensional image, to form respective N-dimensional subset volumes; and combining the N-dimensional subset volumes to form the N-dimensional volume.

In one aspect of the invention, the N-dimensional volume is formed at additional values of $x_N$.

In another aspect of the invention, $k'_{1:N-1}$ is calculated in an analytical form and the analytical form of $k'_{1:N-1}$ is evaluated on a regular rectilinear grid to determine the impulse response for each value of $x_N$.

Another aspect of the invention comprises calculating $k'_{1:N-1}$ on an irregular grid; and interpolating $k'_{1:N-1}$ onto a regular rectilinear grid to determine the impulse response for each value of $x_N$.

A further aspect of the invention comprises calculating a frequency space phase $\phi$ of the impulse response at one or more values of $x_N$ to determine the impulse response for each value of $x_N$.

Another aspect of the invention comprises calculating the frequency space phase $\phi$ of the impulse response by forming the impulse response at one or more values of $x_N$; calculating a Fourier transform of the impulse response at each value of $x_N$; and calculating a phase of each Fourier transform.

Another aspect of the invention comprises calculating the frequency space phase $\phi$ of the impulse response by interpolating irregularly-sampled impulse frequency space data at one or more values of $x_N$ onto a regularly-sampled grid.

A further aspect of the invention comprises forming the impulse response at two or more values of $x_N$; calculating a Fourier transform for each impulse response; dividing one of the Fourier transforms by another one of the Fourier transforms; and calculating a phase of the divisor to calculate the frequency space phase $\phi$ of the impulse response.

Another aspect of the invention comprises adjusting, as $x_N$ varies, a slope formed by $k'_{1:N-1}$ of the impulse response to compensate for an effect on the collected data set due to curved wavefronts.

Another aspect of the invention comprises calculating the impulse response from an irregularly-sampled data at one value of $x_N$.

Another aspect of the invention comprises calculating the impulse response from an irregularly-sampled data at regular $x_N$ intervals.

Another aspect of the invention comprises determining the regular $x_N$ intervals by $x_N = n\Delta x_N$, where n is an integer.

Another aspect of the invention comprises determining the regular $x_N$ intervals by $x_N = \Delta x_N^n$, where n is an integer.

Another aspect of the invention comprises calculating the impulse response from the irregularly-sampled data at irregular $x_N$ intervals.

Another aspect of the invention comprises calculating the (N-1)-dimensional images on a regular rectilinear sampling grid at one or more $x_N$ values.

Another aspect of the invention comprises calculating the (N-1)-dimensional image at one $x_N$ value.

Another aspect of the invention comprises calculating the (N-1)-dimensional image at regular $x_N$ intervals.

Another aspect of the invention comprises determining the regular $x_N$ intervals by $x_N = n\Delta x_N$, where n is an integer.

Another aspect of the invention comprises determining the regular $x_N$ intervals by $x_N = \Delta x_N^n$, where n is an integer.

Another aspect of the invention comprises calculating the (N-1)-dimensional image at irregular $x_N$ intervals.

Another aspect of the invention comprises performing the convolution operation by multiplication in a frequency space.

Another aspect of the invention comprises performing the convolution operation directly in a spatial domain.

Another aspect of the invention comprises performing the convolution and combining operations as a discrete Fourier transform in the N-th dimension and as a fast Fourier transform in the other N-1 dimensions.

Another aspect of the invention comprises performing the discrete Fourier transform in the N-th dimension as an interpolation and a fast Fourier transform.

In another embodiment of the invention, a computer readable medium stores a program to form an N-dimensional volume, where N is not less than two, from a collected data set, which is divided into a plurality of single-valued subsets, comprising: forming at least one (N-1)-dimensional images from each of the single-valued subsets, respectively; performing a convolution operation on each (N-1)-dimensional image and an impulse response at different values of $x_N$, where $x_N$ is a dimension not formed in the (N-1) dimensional image, to form respective N-dimensional subset volumes; and combining the N-dimensional subset volumes to form the N-dimensional volume.

In a further embodiment of the invention, a system comprises: a sensor to collect a data set relating to a structure of a scene; a transfer unit in communication with the sensor to receive the collected data set from the sensor; a computer connected to the transfer unit which operates a program stored thereon to form an N-dimensional volume, where N is not less than two, from the transferred collected data set, which is divided into a plurality of single-valued subsets, the program performing a process comprising forming at least one (N-1)-dimensional images from each of the single-valued subsets, respectively, performing a convolution operation on each (N-1)-dimensional image and an impulse response at different values of $x_N$, where $x_N$ is a dimension not formed in the (N-1) dimensional image, to form respective N-dimensional subset volumes, and combining the N-dimensional subset volumes to form the N-dimensional volume; and a display to display the N-dimensional volume.

In an aspect of the invention, the sensor uses electromagnetic radiation.

In another aspect of the invention, the electromagnetic radiation is radar.

In another aspect of the invention, the sensor uses one of particle radiation, acoustic radiation, and magnetic resonance imaging.

In another aspect of the invention, the transfer unit includes one of a network, magnetic media, and optical media.

In another aspect of the invention, the display is one of a CRT, a printer, a volumetric display, a stereoscopic, and an immersion display.

These and other objects and embodiments of the invention will become readily apparent to those of ordinary skill in the art from the following description of the invention, which is to be read in conjunction with the accompanying drawings and appended claims.

BRIEF DESCRIPTION OF THE DRAWINGS

Embodiments of the invention will now be described by way of example with reference to the accompanying drawings in which.

DETAILED DESCRIPTION OF THE INVENTION

This invention can compensate for both wavefront curvature and irregular motion. When used to form 3-D images from 2-D images formed by another SAR algorithm, its computational complexity lies between the fast TDBP algorithms and the PFA and RMA algorithms.

Figure 8:
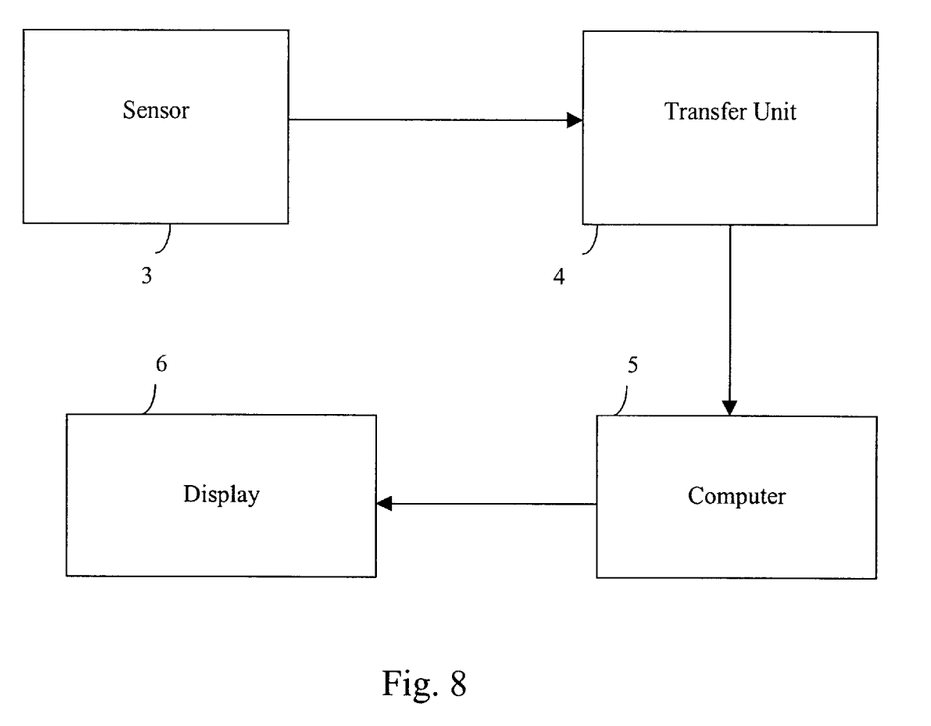
FIG. 8 is an example of a system according to an embodiment of the invention.

A system according to an embodiment of the invention is illustrated in FIG. 8, for example. First, a sensor 3 can detect information about an object or a scene. Many different types of sensors may be used as are well known in the art. For example, electromagnetic (EM) sensors include well-know sensors such as radar, optical, and X-ray sensors as well as lesser-known sensors such as gamma ray and terahertz sensors. Particle radiation sensors most commonly use electrons. Acoustic sensors are used in seismic and ultrasound applications. Data from magnetic resonance imaging sensors may also be used. Next, data may be transferred from the sensor to the computer via a transfer unit 4. The transfer unit 4 may include a network or magnetic or optical media. After a computer 5 forms an image according to this invention, the image may be displayed on a display 6 in a number of ways. For example, the use of CRT displays and printers are common, but other displays are being developed specifically for viewing imagery with more than two dimensions and are within the scope of this invention. Volumetric displays create true 3-D renderings of an image. Various types of stereoscopic displays create the illusion of 3-D images from 2-D displays by presenting slightly different information to each eye. Immersion environments also create the illusion of being inside a 3-D image by surrounding the viewer with 2-D displays of appropriate sections of the 3-D image.

This invention is similar to the convolution backpropagation and convolution backprojection (CBP) techniques. However, previous applications of the CBP algorithm to SAR have propagated data from individual pulses. This invention, on the other hand, can propagate data from 2-D images. This reduces the computational complexity. Convolution backprojection has also been used to propagate 2-D images in computed tomography applications with parallel beam, fan beam, and cone beam sources. However, those applications use special propagation functions that have been derived specifically for the well-controlled beam shapes and detector arrays used. In contrast, the propagation functions in the 3-D SAR application are a function of the antenna path, which may be irregular and differ between different collections. Therefore, a completely general method of calculating the propagation function for this invention has been derived.

In the following description, embodiments of the invention are explained in detail. First, the formation of a 3-D function $f(x,y,z)$, e.g., a complex-valued image volume, from irregularly-spaced samples of its Fourier transform $F(k_x,k_y,k_z)$ is considered. Assume for now that the frequency space data is single valued in $k_z$, i.e., only one sample exists for any ordered pair $(k_x,k_y)$. Under this assumption, the 2-D function $f(x,y,z=z')$ is equal to the convolution of the 2-D function $f(x,y,z=0)$ with the 2-D impulse response $I(x,y,z=z')$, as derived below. Consider the 3-D Fourier transform equation, $$f(x,y,z) = \iiint F(k_x,k_y,k_z) e^{j2\pi(k_x x + k_y y + k_z z)} dk_x dk_y dk_z. \quad (1)$$

If $F(k_x,k_y,k_z)$ is single-valued in $k_z$, then it can be rewritten as $$F(k_x,k_y,k_z) = F(k_x,k_y)\delta(k_z - k_z'(k_x,k_y)), \quad (2)$$

where $k'_z(k_x,k_y)$ is a function describing the variation of $k_z$ with $k_x$ and $k_y$. That is, $k'_z(k_x,k_y)$ is the locus of the frequency space data. By the projection-slice theorem, $F(k_x,k_y)$ is the Fourier transform of the 2-D function $f(x,y,z=0)$. Substituting Equation (2) into Equation (1), we obtain $$f(x, y, z) = \iiint F(k_x, k_y)\delta(k_z - k'_z(k_x, k_y)) e^{j2\pi(k_x x + k_y y + k_z z)} dk_x dk_y dk_z \quad (3)$$

$$= \iint \underbrace{F(k_x, k_y)}_{\substack{2D\ FT\ of \\ f(x,y,z=0)}} \underbrace{e^{j2\pi k'_z(k_x,k_y)z}}_{\substack{2D\ FT\ of \\ I(x,y,z)}} e^{j2\pi(k_x x + k_y y)} dk_x dk_y.$$

By the convolution theorem of the Fourier transform, multiplication in frequency space is equivalent to convolution in image space. The 2-D function $f(x,y,z=z')$ at any arbitrary value of $z=z'$ is then $$f(x,y,z=z') = f(x,y,z=0) * I(x,y,z=z'), \quad (4)$$

where the symbol * denotes a 2-D convolution operation. Therefore, the complete 3-D function $f(x,y,z)$ can be formed by performing the 2-D convolution operation shown in Equation (4) at multiple values of z. The impulse response $I(x,y,z=z')$ is the propagation function. A number of methods are available for efficient computation of 2-D convolutions. Depending on the form of the impulse response, the convolutions may be best implemented directly in the spatial domain or by multiplication in the frequency domain.

If $F(k_x,k_y,k_z)$ is not single-valued in $k_z$, it may be divided into M subsets that are single-valued, i.e., $$F(k_x, k_y, k_z) = \sum_{n=1}^{M} F_n(k_x, k_y)\delta(k_z - k'_{z,n}(k_x, k_y)). \quad (5)$$

Because the Fourier transform is a linear operation, Equation (3) then becomes $$f(x, y, z) = \iint \sum_{n=1}^{M} F_n(k_x, k_y) e^{j2\pi k'_{z,n}(k_x,k_y)z} e^{j2\pi(k_x x + k_y y)} dk_x dk_y. \quad (6)$$

Therefore, this invention can be used on data sets that are not single-valued in $k_z$.

Figure 9:
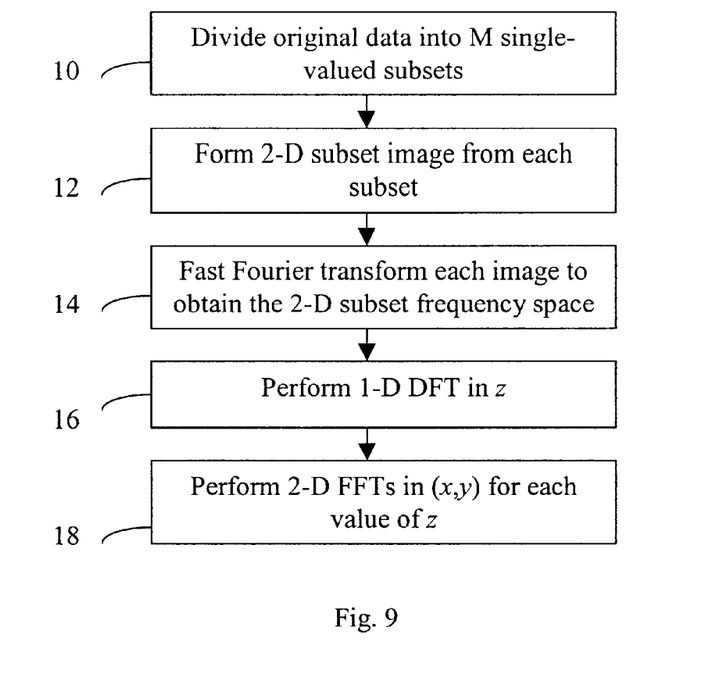
FIG. 9 is a flow diagram illustrating a process according to an embodiment of the invention.

Equation (6) relates to one embodiment of this invention. The inner summation is effectively a 1-D DFT in z. An example of the process represented by Equation (6) is illustrated, for example, in FIG. 9. As shown in FIG. 9, in operation 10, the collected data may be divided into M subsets that are single-valued. Next, in operation 12, a 2-D subset image may be formed from each subset. Next, in operation 14, each image may be fast Fourier transformed to obtain the 2-D subset frequency space. In operation 16, the 1-D DFT in z may be performed. Next, in operation 18, 2-D FFTs in (x,y) for each value of z may be performed, resulting in the final 3-D volume. In some cases, it may be desirable to interpolate the data in z and then use an FFT to implement the DFT.

It may be desirable in some cases to reverse the order of the summation and the Fourier transformation in Equation (6). For example, due to irregular antenna motion, the individual subsets may need to be auto-focused, or their relative positions and phases may need to be adjusted before they are summed. Reversing the order also allows data collected at a later time to be easily formed and added to the prior data. For instance, if the initial image shows an object of interest and more detail is desired, the SAR collection platform may be resent to collect more data from the region. An example of the processing represented by Equation (6), with the summation and Fourier transform reversed, is illustrated in FIG. 10.

Figure 10:
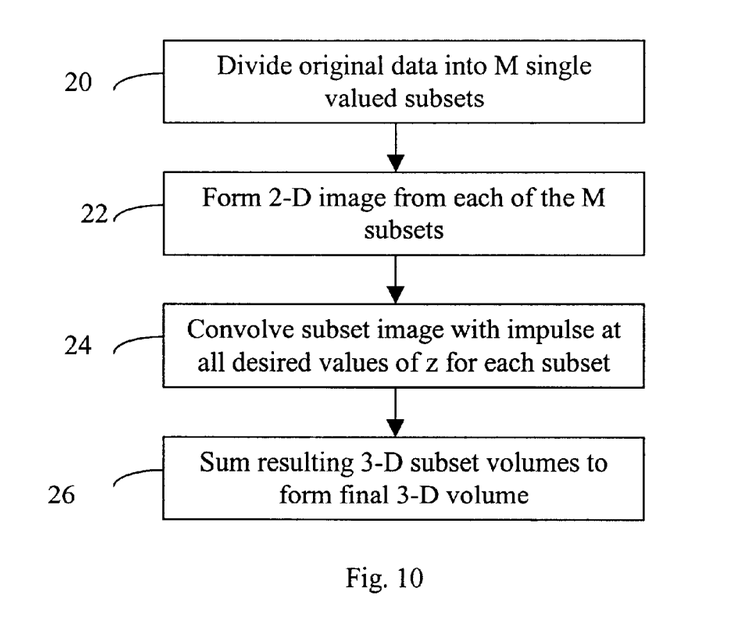
FIG. 10 is a flow diagram illustrating a process according to another embodiment of the invention.

As shown in FIG. 10, in operation 20, the collected data is divided into M subsets that are single-valued. Next, in operation 22, a 2-D image is formed from one of the subsets. In operation 24, this subset image is convolved with the impulse I(x, y, z) at all desired values of z to form a 3-D subset volume. This process may be repeated for all of the subsets. The resulting 3-D subset volumes may be summed in operation 26, for example, to form the final 3-D volume.

Once the 2-D function $f(x,y,z=0)$ and the 2-D impulse responses are formed on a regular rectilinear sampling grid (not shown), all further processing operations are 2-D and use that regular grid. Therefore, an advantage of this invention is that much of the volume reconstruction process uses efficient operations, such as the FFT, on regular grids of data. This technique is therefore much more efficient than techniques that use 3-D processing operations on irregularly-sampled data, or techniques that work on irregularly-sampled data throughout the process. Furthermore, the 3-D image can easily be formed at additional values of z at a later time, if desired. For example, the z position of the region of interest may be originally misestimated. Additional values of z may be required to image the correct region.

Various 2-D algorithms may be used to calculate the 2-D function $f(x,y,z=0)$ on a regular rectilinear sampling grid. For instance, 2-D synthetic aperture radar (SAR) images may be efficiently formed using the polar format algorithm (PFA), the range migration algorithm (RMA), or one of the variants of time domain backprojection (TDBP). Note that not all 2-D algorithms are strictly Fourier transforms. The RMA is one such example. However, herein we will refer to all such algorithms as Fourier transforms for explanation. However, this invention is not limited to Fourier transform algorithms.

In some cases, it may be desirable to use the 2-D algorithm to calculate the image at several values of z in order to minimize errors due to, for example, wavefront curvature or errors in the estimation of the impulse response. In those cases, $f(x,y,z)$ may be calculated at several values of z and, thus, this invention may be used to form $f(x,y,z)$ at values of z between and beyond those values. Any propagation errors would be effectively "reset" at the values of z at which the 2-D images were formed. The values of z at which $f(x,y,z)$ are calculated may be regularly or irregularly spaced. Examples of regular spacings include even spacings (e.g., $z=n\Delta z$, where n is an integer and $\Delta z$ is the spacing) and exponential spacings (e.g., $z=\Delta z^n$, where n is evenly spaced, but not necessarily an integer).

Calculation of the 2-D impulse responses at various values of z on a regular rectilinear sampling grid may be accomplished by several different methods. In the following discussion, the calculation of the impulse response and the calculation of its Fourier transform are treated as equivalent. It may be desirable to select a method that minimizes the number of operations that deal with the irregular sampling of the original data. Several such methods are described below.

First, it is noted that calculation of the impulse response $I(x,y,z=z')$ may be based on knowledge of the function $k_z'(k_x,k_y)$, as indicated in Equation (3). In some cases, the function $k_z'(k_x,k_y)$ may be expressed in an analytical form that then may be evaluated on a regular rectilinear grid in the $k_x$–$k_y$ plane. In other cases, $k_z'(k_x,k_y)$ may be calculated using, for instance, the PFA, and interpolated onto a regular rectilinear grid in the $k_x$–$k_y$ plane. Interpolating a real-valued function such as $k_z'(k_x,k_y)$ is much simpler than interpolating complex-valued functions such as the frequency space data $F(k_x,k_y,k_z)$. Once the function $k_z'(k_x,k_y)$ is obtained on a regular rectilinear grid, the impulse responses may be computed using the FFT. If either of these two methods is used to calculate the impulse responses, then only one 2-D Fourier transform of irregularly-sampled data, to compute $f(x,y,z=0)$, is required to calculate the complete function $f(x,y,z)$ in accordance with Equation (4).

It is possible that the antenna trajectory may be so irregular that the two methods above cannot be used to calculate the impulse responses. In this case, a more general method may be available. Note that the 2-D Fourier transform of the impulse response is a phase-only function, as indicated in Equation (3). If the phase $\phi_1$ can be calculated for a given $z_1$, where $\phi_1=2\pi k_z'(k_x,k_y)z_1$, then the phase $\phi_2$ can be calculated for a given $z_2$ simply by multiplying $\phi_1$ by the ratio $z_2/z_1$, thus avoiding any further operations on the irregularly-sampled data. Another view is that knowledge of the phase $\phi_1$ at a given $z_1$, implies knowledge of $k_z'(k_x,k_y)$. The phase $\phi_1$ may be obtained by calculating the impulse at $z=z_1$, Fourier transforming the impulse, and extracting the phase of the Fourier transform. This method of calculating the impulse response requires only two Fourier transforms of irregularly-sampled data, to compute $f(x,y,z=0)$ and $I(x,y,z=z_1)$, to calculate the complete function $f(x,y,z)$ in accordance with Equation (4). A variant of this method directly interpolates the irregularly-sampled impulse frequency space data for $z=z_1$ onto a regularly-spaced grid without calculating its Fourier transform. This variant may be faster than actually reconstructing the impulse, but may also be less accurate.

Figure 11:
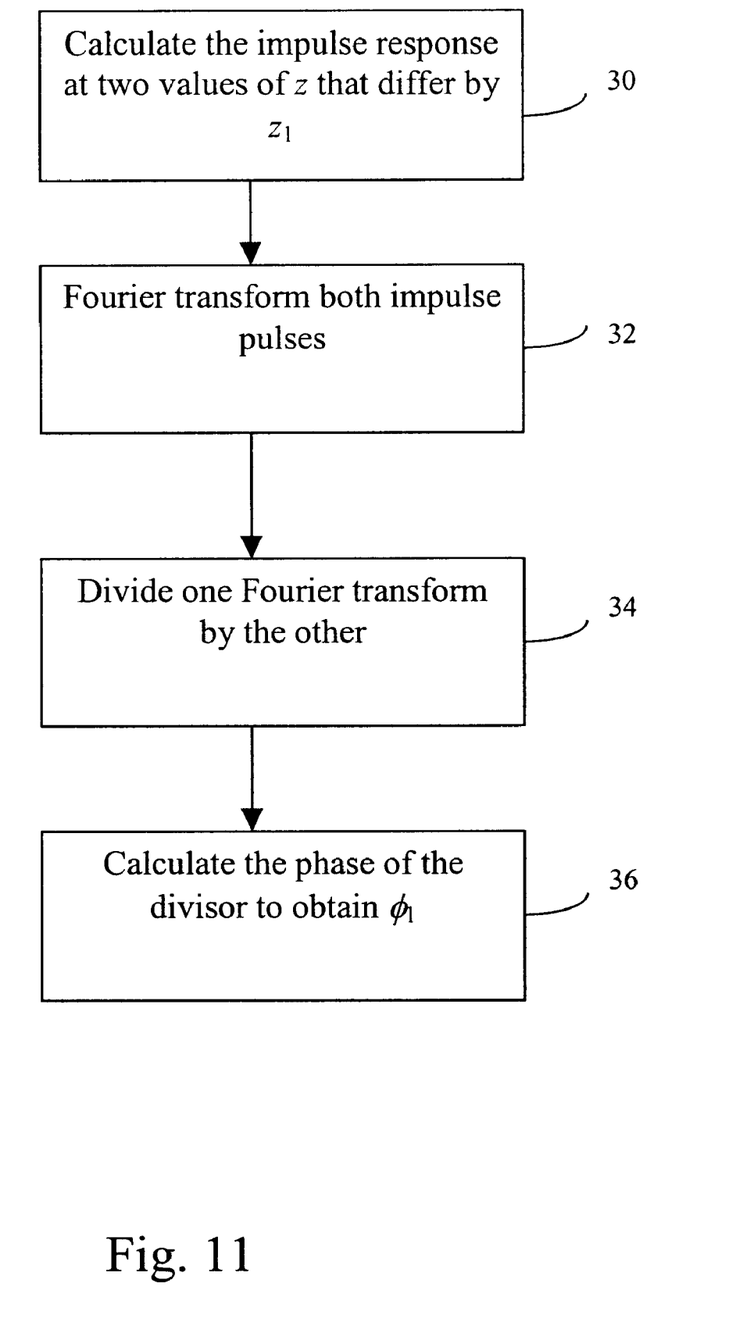
FIG. 11 is a flow diagram illustrating a process of calculating impulse responses according to an embodiment of the invention.

A slightly more accurate method of calculating the phase $\phi_1$ requires the reconstruction of impulse responses at two values of z. Note that the previous development implicitly assumed that the phase of the Fourier transform of the z=0 impulse was 0 everywhere. However, the nominal frequency space of a synthetic aperture sensor does not usually cover the entire extent of the Fourier transform. Further, the phase of the Fourier transform of the impulse at z=0 is often not equal 0 everywhere. Because of the finite extent of the impulse, its Fourier transform has sidelobes beyond the nominal extent of the impulse's frequency space. These sidelobes have a small amount of energy. To obtain the correct phase in the sidelobe region as well as the nominal frequency space, the phase $\phi_1$ may be calculated by forming impulse responses at two values of z whose difference equals $z_1$, as illustrated in FIG. 11, for example. The impulse responses at the two values of z that differ by $z_1$ may be computed using any appropriate 2-D algorithm, such as TDBP, PFA, or RMA, as shown in operation 30, for example. Then, as shown in operation 32, for example, the impulse responses are Fourier transformed using the FFT. As shown in operation 34, one transform may be divided by the other. In operation 36, the phase of the divisor is calculated to obtain the desired phase $\phi_1$. This method of calculating the impulse response requires only three Fourier transforms of irregularly-sampled data, to compute $f(x,y,z=0)$, $I(x,y,z=z')$, and $I(x,y,z=z'+z_1)$, to calculate the complete function $f(x,y,z)$ in accordance with Equation (4). A variant of this method directly interpolates the irregularly-sampled impulse frequency space data for $z=z'$ and $z=z'+z_1$ onto regularly-spaced grids without calculating their Fourier transforms. This variant may be faster than actually reconstructing the impulse, but may also be less accurate.

In either of the previous two methods that calculate the phase $\phi$hd 1, the phase must be unwrapped if it is wrapped. Phase wrapping occurs because phase is only unique over a 360° interval, such as −180° to 180°. If the phase exceeds the boundaries of this unique range, the value will wrap around. For instance, a phase of 200° would appear as a phase of −160°. Many phase unwrapping techniques are available and are well known in the art.

Any errors in the frequency phase $\phi_1$ of the estimated impulse increase linearly with z. It may be desirable to calculate the impulse response from the irregular data, or irregular intervals, at several values of z in order to minimize errors. The values of z at which the impulse response is calculated may be regularly or irregularly spaced. Examples of regular spacings, or regular intervals, include even spacings and exponential spacings. Once the impulse response has been calculated at one set of z values, the impulse response at other values of z may be calculated therefrom. For example, impulse responses may be calculated from the irregular data at z=1 and at z=10n. The impulse response at z=11 would then be calculated from the impulse responses at z=1 and z=10. Suppose that instead the impulse responses had been calculated from the irregular data at $z=2^n$; the impulse response at $z=11$ would then be calculated from the impulse responses at $z=8$, $z=2$, and $z=1$.

Analytic adjustments may also be made to the impulse response to compensate for effects such as curved wavefronts. Consider, for instance, a SAR collection in which the radar flies a nominally straight line trajectory. The frequency space locus $k_z'(k_x,k_y)$ of the impulse response is roughly a sloped plane. Because of wavefront curvature, the slope of this plane varies with z. According to the foregoing description of this invention, it is assumed that the slope is constant. However, the slope may be adjusted as z varies to compensate for wavefront curvature without greatly increasing the computational complexity. If this sort of modification is used, the method of this invention is no longer performing a normal Fourier transform.

The formation of $f(x,y,z=11)$ from several possible combinations of images and impulses will now be explained. The formation of $f(x,y,z=11)$ may be performed by convolving $f(x,y,z=0)$ with $I(x,y,z=11)$. In this case, $I(x,y,z=11)$ is formed by multiplying the frequency phase of $I(x,y,z=1)$ by 11. Any errors in the estimation of the frequency phase are multiplied by 11. Such multiplication of errors may be avoided by calculating the image and/or impulse response at several values of z. For instance, images may be calculated directly from the irregular 2-D data at $z=0$ and $z=10n$. In this case, $f(x,y,z=11)$ is formed by the convolution of $f(x,y,z=10)$ with $I(x,y,z=1)$ and frequency phase errors are not multiplied. If images are instead calculated directly at $z=2^n$, then $\eta(x,y,z=11)$ is formed by the convolution of $f(x,y,z=8)$ with $I(x,y,z=3)$, which is formed by multiplying the frequency phase of $I(x,y,z=1)$ by 3. In this case, frequency phase errors are only multiplied by 3. The impulses could also be estimated at multiple values of z. For instance, the impulses may be estimated at $z=1$ and $z=10n$, and $I(x,y,z=11)$ calculated by convolving $I(x,y,z=10)$ and $I(x,y,z=1)$. Impulses could also be estimated at $z=2^n$, and $I(x,y,z=11)$ would be calculated by convolving $I(x,y,z=2^3)$, $I(x,y,z=2^1)$, and $I(x,y,z=2^0)$. In both cases, the total errors introduced by summing the impulse responses will likely be less than the total errors introduced by multiplying the frequency phase of $I(x,y,z=1)$ by 11.

The following description compares the computational load and accuracy of various algorithms for a 3-D SAR imaging scenario. This description assumes input data containing N subsets of N pulses each, where each pulse has N frequencies, and an output N×N×N pixel image volume. The order of computational complexity is an estimate of how the computational power required by an algorithm scales with N. For instance, an algorithm with a computational complexity of N will require twice as much computational power if N is doubled. In contrast, an algorithm with a computational complexity of $N^2$ will require four times as much computational power if N is doubled. The order of complexity thus gives an idea of the relative computational load of various algorithms.

In 3-D time domain backpropagation (TDBP), each of the $N^3$ input data points must be propagated to each of the $N^3$ output data points, making the order of complexity $N^6$. This method has the greatest computational complexity, but also the greatest accuracy because it perfectly compensates for effects such as wavefront curvature and non-ideal motion. If N is increased from 128 to 256, the computational load will increase by 64 times.

In 3-D fast TDBP, each of the $N^2$ radar pulses is range compressed. The contribution of that pulse to any given output point is interpolated from the range compressed pulse. Therefore, an interpolation must be performed at $N^3$ output data points for each of $N^2$ pulses, yielding a complexity of $O(N^5)$. The interpolation introduces a small amount of error relative to the full TDBP. If N is increased from 128 to 256, the computational load will increase by 32 times.

In using 2-D fast TDBP together with the method of the present invention, the fast TDBP algorithm may be used to form 2-D images. The 2-D images are then preferably propagated into a volume by the method of the present invention. For the fast TDBP algorithm, an interpolation must be performed at $N^2$ output data points for each of $N^2$ pulses, yielding a complexity of $O(N^4)$. The most complex operation in the step involving the method of the present invention may be the 2-D FFTs used to calculate the convolution operations. Each of the N 2-D images must be propagated to N planes in z, requiring $N^2$ FFTs. The computational complexity of each FFT is $O(N^2\log_2 N)$. Thus, the overall complexity of this calculation is $O(N^4\log_2 N)$. The approximations made in calculating the impulse responses, as discussed above, introduce a small amount of error relative to the 3-D fast TDBP. If N is increased from 128 to 256, the computational load will increase by 18 times.

In 3-D interpolation and fast Fourier transform, SAR algorithms such as the PFA or RMA use an interpolation and a Fourier transform to form an image. The most complex aspect of this type of computation is the FFT, which has a complexity of $O(N^3\log_2 N)$. This speed comes at the cost of accuracy. Further, the PFA cannot compensate for wavefront curvature, while the RMA can only make a first-order compensation for non-ideal motion. If N is increased from 128 to 256, the computational load will increase by 9 times.

In 3-D quadtree TDBP, the quadtree approximation allows a trade-off between image quality and image formation speed. With lower image qualities, this algorithm has a complexity of $O(N^3\log_2 N)$, similar to the PFA and RMA. As the image quality improves, the formation speed tends towards that of the fast TDBP algorithm, $O(N^5)$. At the highest image quality, therefore, an increase in N from 128 to 256 will increase the computational load by 32 times.

A technique for efficiently computing the Fourier transform of an irregularly-sampled data set has been described herein above. It should be noted that this technique is particularly applicable to data sets of dimension three or higher. One example application is the formation of a 3-D image from irregularly-sampled 3-D synthetic aperture radar data. Synthetic aperture image formation may be found in the fields of synthetic aperture radar, synthetic aperture sonar, ultrasound imaging, magnetic resonance imaging, optical imaging, microscopic imaging, seismic imaging, and other areas. This technique requires either one or three 2-D Fourier transforms of irregularly-sampled data, and then 2-D convolutions of regularly-sampled data to produce different slices in z of the function $f(x,y,z)$.

It is noted that the present invention is not limited to 3-D data sets and it may also be applied to the processing of N-dimensional irregularly-sampled data sets using (N-1)-dimensional Fourier transforms to form N-dimensional functions. In this general case, the frequency space and spatial co-ordinates may be specified as vectors k and x, respectively. The first N-1 dimensions of these vectors may be specified as $k_{1:N-1}$ and $x_{1:N-1}$, respectively, and the last dimension as $k_N$ and $x_N$, respectively. In the 3-D case discussed previously, $k_{1:N-1}=(k_x,k_y)$, $k_N=z$, $x_{1:N-1}=(x,y)$, and $x_N=z$.

What is claimed is:

1. A method of forming an N-dimensional volume, where N is not less than two, from a collected data set which comprises a plurality of single-valued subsets, comprising:
    forming at least one (N-1)-dimensional images from each of the single-valued subsets, respectively;
    performing a convolution operation on each (N-1)-dimensional image and an impulse response at different values of $x_N$, where $x_N$ is a dimension not formed in the (N-1) dimensional image, to form respective N-dimensional subset volumes; and combining the N-dimensional subset volumes to form the N-dimensional volume.

2. The method as claimed in claim 1, further comprising forming the N-dimensional volume at additional values of $x_N$.

3. The method of claim 1, further comprising:
calculating $k'_{1:N-1}$ in an analytical form; and
evaluating the analytical form of $k'_{1:N-1}$ on a regular rectilinear grid to determine the impulse response for each value of $x_N$.

4. The method of claim 1, further comprising:
calculating $k'_{1:N-1}$ on an irregular grid; and
interpolating $k'_{1:N-1}$ onto a regular rectilinear grid to determine the impulse response for each value of $x_N$.

5. The method of claim 1, further comprising calculating a frequency space phase $\phi$ of the impulse response at one or more values of $x_N$ to determine the impulse response for each value of $x_N$.

6. The method of claim 5, further comprising:
calculating the frequency space phase $\phi$ of the impulse response by forming the impulse response at one or more values of $x_N$;
calculating a Fourier transform of the impulse response at each value of $x_N$; and
calculating a phase of each Fourier transform.

7. The method of claim 5, further comprising calculating the frequency space phase $\phi$ of the impulse response by interpolating irregularly-sampled impulse frequency space data at one or more values of $x_N$ onto a regularly-sampled grid.

8. A method of forming an N-dimensional volume, where N is not less than two, from a collected data set which comprises a plurality of single-valued subsets, comprising:
forming at least one (N-1)-dimensional images from each of the single-valued subsets, respectively;
performing a convolution operation on each (N-1)-dimensional image and an impulse response at different values of $x_N$, where $x_N$ is a dimension not formed in the (N-1) dimensional image, to form respective N-dimensional subset volumes;
combining the N-dimensional subset volumes to form the N-dimensional volume;
calculating a frequency space phase $\phi$ of the impulse response at one or more values of $x_N$ to determine the impulse response for each value of $x_N$;
forming the impulse response at two or more values of $x_N$;
calculating a Fourier transform for each impulse response;
dividing one of the Fourier transforms by another one of the Fourier transforms; and
calculating a phase of the divisor to calculate the frequency space phase $\phi$ of the impulse response.

9. A method of forming an N-dimensional volume, where N is not less than two, from a collected data set which comprises a plurality of single-valued subsets, comprising:
forming at least one (N-1)-dimensional images from each of the single-valued subsets, respectively;
performing a convolution operation on each (N-1)-dimensional image and an impulse response ax different values of $x_N$, where $x_N$ is a dimension not formed in the (N-1 dimensional image, to form respective N-dimensional subset volumes;
combining the N-dimensional subset volumes to form the N-dimensional volume;
calculating a frequency space phase $\phi$ of the impulse response at one or more values of $x_N$ to determine the impulse response for each value of $x_N$;
interpolating irregularly-sampled impulse frequency space data at two or more values of $x_N$ onto a regularly-sampled grid;
dividing one set of interpolated data by another set of interpolated data; and
calculating a phase of the divisor to calculate the frequency space phase $\phi$ of the impulse response.

10. The method of claim 1, further comprising adjusting, as $x_N$ varies, a slope formed by $k'_{1:N-1}$ of the impulse response to compensate for an effect on the collected data set due to curved wavefronts.

11. The method of claim 1, further comprising calculating the impulse response from an irregularly-sampled data at one value of $x_N$.

12. The method of claim 1, further comprising calculating the impulse response from an irregularly-sampled data at regular $x_N$ intervals.

13. The method of claim 12, further comprising determining the regular $x_N$ intervals by $x_N = n \Delta x_N$, where n is an integer.

14. The method of claim 12, further comprising determining the regular $x_N$ intervals by $x_N = \Delta x_N^n$, where n is an integer.

15. The method of claim 1, further comprising calculating the impulse response from the irregularly-sampled data at irregular $x_N$ intervals.

16. The method of claim 1, further comprising calculating the (N-1)-dimensional images on a regular rectilinear sampling grid at one or more $x_N$ values.

17. The method of claim 16, further comprising calculating the (N-1)-dimensional image at one $x_N$ value.

18. The method of claim 16, further comprising calculating the (N-1)-dimensional image at regular $x_N$ intervals.

19. The method of claim 18, further comprising determining the regular $x_N$ intervals by $x_N = n \Delta x_N$, where n is an integer.

20. The method of claim 18, further comprising determining the regular $x_N$ intervals by $x_N = \Delta x_N^n$, where n is an integer.

21. The method of claim 16, further comprising calculating the (N-1)-dimensional image at irregular $x_N$ intervals.

22. The method of claim 1, further comprising performing the convolution operation by multiplication in a frequency space.

23. The method of claim 1, further comprising performing the convolution operation directly in a spatial domain.

24. The method of claim 1, further comprising performing the convolution and combining operations as a discrete Fourier transform in the N-th dimension and as a fast Fourier transform in the other N-1 dimensions.

25. The method of claim 24, further comprising performing the discrete Fourier transform in the N-th dimension as an interpolation and a fast Fourier transform.

26. A computer readable medium storing a program to form an N-dimensional volume, where N is not less than two, from a collected data set, which is divided into a plurality of single-valued subsets, comprising:
forming at least one (N-1)-dimensional images from each of the single-valued subsets, respectively;
performing a convolution operation on each (N-1)-dimensional image and an impulse response at different values of $x_N$, where $x_N$ is a dimension not formed in the (N-1) dimensional image, to form respective N-dimensional subset volumes; and
combining the N-dimensional subset volumes to form the N-dimensional volume.

27. A system comprising:
a sensor to collect a data set relating to a structure of a scene;
a transfer unit in communication with the sensor to receive the collected data set from the sensor; a computer connected to the transfer unit which operates a program stored thereon to form an N-dimensional volume, where N is not less than two, from the transferred collected data set, which is divided into a plurality of single-valued subsets, the program performing a process comprising
forming at least one (N-1)-dimensional images from each of the single-valued subsets, respectively,
performing a convolution operation on each (N-1)-dimensional image and an impulse response at different values of $x_N$, where $x_N$ is a dimension not formed in the (N-1) dimensional image, to form respective N-dimensional subset volumes, and
combining the N-dimensional subset volumes to form the N-dimensional volume; and
a display to display the N-dimensional volume.

28. The system of claim 27, wherein the sensor uses electromagnetic radiation.

29. The system of claim 28, wherein the electromagnetic radiation is radar.

30. The system of claim 27, wherein the sensor uses one of particle radiation, acoustic radiation, and magnetic resonance imaging.

31. The system of claim 27, wherein the transfer unit includes one of a network, magnetic media, and optical media.

32. The system of claim 27, wherein the display is one of a CRT, a printer, a volumetric display, a stereoscopic, and an immersion display.

* * * * *